US012580877B2

(12) United States Patent　　(10) Patent No.:　US 12,580,877 B2
Jiang　　(45) Date of Patent:　Mar. 17, 2026

(54) CHAT INTERACTION METHOD, ELECTRONIC DEVICE, AND SERVER

(71) Applicant: Petal Cloud Technology Co., Ltd., Dongguan (CN)

(72) Inventor: Lei Jiang, Nanjing (CN)

(73) Assignee: Petal Cloud Technology Co., Ltd., Dongguan City (CN)

( * ) Notice: Subject to any disclaimer, the term of this patent is extended or adjusted under 35 U.S.C. 154(b) by 0 days.

(21) Appl. No.: 18/257,847

(22) PCT Filed: Dec. 9, 2021

(86) PCT No.: PCT/CN2021/136898

§ 371 (c)(1),
(2) Date: Jun. 15, 2023

(87) PCT Pub. No.: WO2022/127689

PCT Pub. Date: Jun. 23, 2022

(65) Prior Publication Data

US 2024/0098045 A1　　Mar. 21, 2024

(30) Foreign Application Priority Data

Dec. 16, 2020　(CN) .......................... 202011492676.9

(51) Int. Cl.
*H04L 51/046*　　(2022.01)
*H04L 51/10*　　(2022.01)
*H04L 51/18*　　(2022.01)

(52) U.S. Cl.
CPC ........... *H04L 51/046* (2013.01); *H04L 51/10* (2013.01); *H04L 51/18* (2013.01)

(58) Field of Classification Search
CPC ........ H04L 51/046; H04L 51/10; H04L 51/18
See application file for complete search history.

(56) References Cited

U.S. PATENT DOCUMENTS 10,200,323 B2　2/2019　Guthery et al.
2018/0103000 A1*　4/2018　Guthery ................. G06Q 20/26
(Continued)

FOREIGN PATENT DOCUMENTS

CN　　107046497 A　　8/2017
WO　　2015096722 A1　　7/2015

OTHER PUBLICATIONS

Extended European Search Report in European Appln No. 21905618. 1, dated Mar. 14, 2024, 7 pages.

(Continued)

*Primary Examiner* — Suraj M Joshi
(74) *Attorney, Agent, or Firm* — Fish & Richardson P.C.

(57) ABSTRACT

Example chat interaction methods, electronic devices and servers are disclosed. In one example chat interaction method, a first electronic device sends a video request message of a chat text to a server, where the video request message is used to request at least one target video clip, the target video clip includes a target dialog text that appears in a form of a subtitle, and the target dialog text and the chat text have same or similar semantics. The first electronic device displays the at least one target video clip according to a response message sent by the server, and the first electronic device receives a confirmation instruction from a user, where the confirmation instruction is used to indicate a first video clip. The first electronic device sends a video playback message to the server, where the video playback message is used to indicate the server to send the first video clip to a second electronic device.

17 Claims, 8 Drawing Sheets

(56)    References Cited

U.S. PATENT DOCUMENTS

2018/0234371 A1 *   8/2018  Lande ..................... H04L 51/18
2018/0348890 A1 *  12/2018  Yang ..................... G06N 20/00

OTHER PUBLICATIONS

International Search Report and Written Opinion in International
Appln. No. PCT/CN2021/136898, mailed on Mar. 15, 2022, 17
pages (with English translation).

* cited by examiner (b)

(a)

CHAT INTERACTION METHOD, ELECTRONIC DEVICE, AND SERVER

CROSS-REFERENCE TO RELATED APPLICATIONS

This application is a national stage of International Application No. PCT/CN2021/136898, filed on Dec. 9, 2021, which claims priority to Chinese Patent Application No. 202011492676.9 filed on Dec. 16, 2020. The contents of both of the aforementioned applications are hereby incorporated by reference in their entirety.

TECHNICAL FIELD

This application relates to the technical field of electronic devices, and in particular, to a video-based chat interaction method, an electronic device, and a server.

BACKGROUND

With the rapid development of the mobile Internet, various instant messaging (instant messaging, IM) applications provide users with timely and rich communication experience. During communication, in addition to conventional text information, a sender can also send multimedia information media such as an image, a gif, a voice message, and a video to a receiver, and the multimedia information media are usually stored on a server. The receiver receives a uniform resource locator (uniform resource locator, URL) that is stored on the server and that is of the multimedia information media, and an IM application downloads actual media content according to the URL for the receiver to view.

For example, if a video is to be sent, when a sender wants to share a captured video with a receiver, the sender selects corresponding video content in an IM application and sends the video content. The video is first uploaded to a server, and is cached in a memory of the server. The server synchronizes a corresponding notification message to an IM application of the receiver, and the IM application of the receiver parses out a URL address of the video content stored on the server according to the notification message, downloads the video content corresponding to the URL address from the server to a local disk, and then plays the video by a player of the IM application.

However, most of the foregoing video content is shared by uploading or forwarding pre-made video media, and the video media have basically remained unchanged during transmission. Due to limitations of video content production and semantic irrelevance, the foregoing video content generally has no obvious purpose for contextual communication, and does not obviously facilitate communication between users, resulting in poor communication experience for the users.

SUMMARY

This application provides a chat interaction method, an electronic device, and a server. According to the method, text information that a user wants to express is replaced with video content with a same or similar dialog, thereby improving communication experience of the user.

According to a first aspect, a chat interaction method is provided, including: sending, by a first electronic device, a video request message of a chat text to a server, where the video request message is used to request at least one target video clip, the target video clip includes a target dialog text that appears in a form of a subtitle, and the target dialog text and the chat text have same or similar semantics; displaying, by the first electronic device, the at least one target video clip according to a response message sent by the server; receiving, by the first electronic device, a confirmation instruction from a user, where the confirmation instruction is used to indicate a first video clip, and the first video clip is one of the at least one target video clip; and sending, by the first electronic device, a video playback message to the server, where the video playback message is used to indicate the server to send the first video clip to a second electronic device.

In this embodiment of this application, text information that the user wants to express is replaced with video content with a same or similar dialog, so that more diversified choices other than a text are added for the user to express, and a video for communication is context-associated, thereby improving communication experience of the user. In addition, this application also provides a more novel and interesting interactive experience for an entertainment scenario of instant messaging.

For example, a user #1 wants to communicate with a user #2 through an IM application. After the user 1 enters a chat text in an input box of the IM application, the IM application provides the user #1 with an option of a matched video clip based on an understanding of content of the chat text. After the user #1 selects the option, the chat text may be presented to the user #2 by using a scene in the video clip, and the user #2 may also reply to the user #1 by using the video clip in a same manner. In this way, the video clip for communication is context-associated, and the communication experience of the user can be improved.

Compared with a conventional chat interaction method in which communication can only be performed by using a text, a voice message, or the like, in this embodiment of this application, a capability of quickly matching a user's intention with a video dialog can be achieved according to a text-based vector representation and an efficient vector search capability, and the user may select rich video content to express a meaning that the user wants to express to another user, thereby ensuring fun and diversity.

In a possible implementation, the response message includes the target dialog text of each of the at least one target video clip; and the displaying, by the first electronic device, the at least one target video clip according to a response message sent by the server includes: displaying, by the first electronic device, the target dialog text of each target video clip.

In a possible implementation, the response message further includes a preview poster link corresponding to each target video clip, and the displaying, by the first electronic device, the at least one target video clip according to a response message sent by the server includes: downloading and displaying, by the first electronic device, a preview poster of each target video clip according to the preview poster link.

In a possible implementation, the response message further includes information about a download address of a complete video corresponding to the first video clip, and information about a time segment location of the first video clip in the complete video; and the displaying, by the first electronic device, the at least one target video clip according to a response message sent by the server includes: downloading and playing, by the first electronic device, the first video clip according to the download address and the time segment location.

In a possible implementation, before the sending, by a first electronic device, a video request message of a chat text to a server, the method further includes: determining, by the first electronic device, that no other input operation is performed within a preset duration after the user enters the chat text in a text input box.

In a possible implementation, there are a plurality of target video clips, the response message further includes information about matching degrees, and the displaying, by the first electronic device, the at least one target video clip according to a response message sent by the server includes: displaying, by the first electronic device, each of the target video clips in a form of a list according to the matching degrees in descending order.

According to a second aspect, a chat interaction method is provided, including: receiving, by a server, a video request message of a chat text sent by a first electronic device, where the video request message is used to request at least one target video clip, the target video clip includes a target dialog text that appears in a form of a subtitle, and the target dialog text and the chat text have same or similar semantics; determining, by the server, the at least one target video clip according to the chat text; sending, by the server, a response message to the first electronic device, where the response message is used by the first electronic device to display the at least one target video clip; receiving, by the server, a video playback message sent by the first electronic device, where the video playback message is used to indicate the server to send a first video clip to a second electronic device, and the first video clip is one of the at least one target video clip; and sending, by the server, the first video clip to the second electronic device.

In a possible implementation, the response message includes the target dialog text of each of the at least one target video clip.

In a possible implementation, the response message further includes a preview poster link corresponding to each target video clip, and the preview poster link is used by the first electronic device to download and display a preview poster of each target video clip.

In a possible implementation, the response message further includes information about a download address of a complete video corresponding to the first video clip, and information about a time segment location of the first video clip in the complete video, and the download address and the time segment location are used by the first electronic device to download and play the first video clip.

In a possible implementation, there are a plurality of target video clips, the response message further includes information about matching degrees, and the matching degrees are used by the first electronic device to display each of the target video clips in a form of a list in descending order of the matching degrees.

In a possible implementation, the determining, by the server, the at least one target video clip according to the chat text includes: matching the chat text with a dialog text in a dialog text index library, where the dialog text index library includes a correspondence between the dialog text and a video clip; and determining a video clip corresponding to the successfully matched dialog text as the target video clip.

In a possible implementation, the correspondence between the dialog text and a video clip includes a correspondence between the dialog text and the complete video, and a correspondence between the dialog text and a time segment location of the dialog text in the complete video; and the determining a video clip corresponding to the successfully matched dialog text as the target video clip includes: determining, as the target video clip, video content that is of the complete video corresponding to the successfully matched dialog text and that is located at the time segment location.

In a possible implementation, the dialog text in the dialog text index library exists in a form of a dialog text vector, and the matching the chat text with a dialog text in a dialog text index library includes: converting the chat text into a chat text vector; and calculating a relative distance between the chat text vector and the dialog text vector; and the determining a video clip corresponding to the successfully matched dialog text as the target video clip includes: determining a video clip corresponding to the dialog text vector whose relative distance from the chat text vector is less than a preset threshold as the target video clip. In this application, a capability of quickly matching a user's intention with a video dialog can be achieved according to a text-based vector representation and an efficient vector search capability, and user experience can be improved.

According to a third aspect, an electronic device is provided, including one or more processors and one or more memories, where the one or more memories store one or more computer programs, the one or more computer programs include instructions, and when the instructions are executed by the one or more processors, the electronic device is enabled to perform the following steps: sending a video request message of a chat text to a server, where the video request message is used to request at least one target video clip, the target video clip includes a target dialog text that appears in a form of a subtitle, and the target dialog text and the chat text have same or similar semantics: displaying the at least one target video clip according to a response message sent by the server; receiving a confirmation instruction from a user, where the confirmation instruction is used to indicate a first video clip, and the first video clip is one of the at least one target video clip; and sending a video playback message to the server, where the video playback message is used to indicate the server to send the first video clip to a second electronic device.

In a possible implementation, the response message includes the target dialog text of each of the at least one target video clip, and when the instructions are executed by the one or more processors, the electronic device is enabled to perform the following step: displaying the target dialog text of each target video clip.

In a possible implementation, the response message further includes a preview poster link corresponding to each target video clip, and when the instructions are executed by the one or more processors, the electronic device is enabled to perform the following step: downloading and displaying a preview poster of each target video clip according to the preview poster link.

In a possible implementation, the response message further includes information about a download address of a complete video corresponding to the first video clip, and information about a time segment location of the first video clip in the complete video, and when the instructions are executed by the one or more processors, the electronic device is enabled to perform the following step: downloading and playing the first video clip according to the download address and the time segment location.

In a possible implementation, when the instructions are executed by the one or more processors, the electronic device is enabled to perform the following step: before sending the video request message of the chat text to the server, determining that no other input operation is performed within a preset duration after the user enters the chat text in a text input box.

In a possible implementation, there are a plurality of target video clips, the response message further includes information about matching degrees, and when the instructions are executed by the one or more processors, the electronic device is enabled to perform the following step: displaying each of the target video clips in a form of a list according to the matching degrees in descending order.

According to a fourth aspect, a server is provided, including one or more processors and one or more memories, where the one or more memories store one or more computer programs, the one or more computer programs include instructions, and when the instructions are executed by the one or more processors, the server is enabled to perform the following steps: receiving a video request message of a chat text sent by a first electronic device, where the video request message is used to request at least one target video clip, the target video clip includes a target dialog text that appears in a form of a subtitle, and the target dialog text and the chat text have same or similar semantics: determining the at least one target video clip according to the chat text; sending a response message to the first electronic device, where the response message is used by the first electronic device to display the at least one target video clip; receiving a video playback message sent by the first electronic device, where the video playback message is used to indicate the server to send a first video clip to a second electronic device, and the first video clip is one of the at least one target video clip; and sending the first video clip to the second electronic device.

In a possible implementation, the response message includes the target dialog text of each of the at least one target video clip.

In a possible implementation, the response message further includes a preview poster link corresponding to each target video clip, and the preview poster link is used by the first electronic device to download and display a preview poster of each target video clip.

In a possible implementation, the response message further includes information about a download address of a complete video corresponding to the first video clip, and information about a time segment location of the first video clip in the complete video, and the download address and the time segment location are used by the first electronic device to download and play the first video clip.

In a possible implementation, there are a plurality of target video clips, the response message further includes information about matching degrees, and the matching degrees are used by the first electronic device to display each of the target video clips in a form of a list in descending order of the matching degrees.

In a possible implementation, when the instructions are executed by the one or more processors, the server is enabled to perform the following steps: matching the chat text with a dialog text in a dialog text index library, where the dialog text index library includes a correspondence between the dialog text and a video clip; and determining a video clip corresponding to the successfully matched dialog text as the target video clip.

In a possible implementation, the correspondence between the dialog text and a video clip includes a correspondence between the dialog text and the complete video, and a correspondence between the dialog text and a time segment location of the dialog text in the complete video; and when the instructions are executed by the one or more processors, the electronic device is enabled to perform the following step: determining, as the target video clip, video content that is of the complete video corresponding to the successfully matched dialog text and that is located at the time segment location.

In a possible implementation, the dialog text in the dialog text index library exists in a form of a dialog text vector, and when the instructions are executed by the one or more processors, the server is enabled to perform the following steps: converting the chat text into a chat text vector; calculating a relative distance between the chat text vector and the dialog text vector; and determining a video clip corresponding to the dialog text vector whose relative distance from the chat text vector is less than a preset threshold as the target video clip.

According to a fifth aspect, a graphical user interface on an electronic device is provided. The electronic device has a display, a memory, and one or more processors. For example, the electronic device includes the first electronic device or the second electronic device in the first aspect, the one or more processors are configured to execute one or more computer programs stored in the memory, and the graphical user interface includes a graphical user interface displayed when the first electronic device or the second electronic device performs any possible chat interaction method according to any one of the foregoing aspects.

According to a sixth aspect, an apparatus is provided. The apparatus is included in a first electronic device or a second electronic device, and the apparatus has a function of implementing behavior of the first electronic device or the second electronic device in the first aspect and the possible implementations of the first aspect. The function may be implemented by hardware, or may be implemented by hardware executing corresponding software. The hardware or the software includes one or more modules or units corresponding to the foregoing function, for example, a display module or unit, a detection module or unit, or a processing module or unit.

According to a seventh aspect, a computer-readable storage medium is provided. The computer-readable storage medium stores a computer program, and when the computer program runs on a computer, the computer is enabled to perform the chat interaction method according to any possible implementation of any one of the foregoing aspects.

According to an eighth aspect, a computer program product is provided. When the computer program product runs on a computer, the computer is enabled to perform the chat interaction method according to any possible implementation of any one of the foregoing aspects.

DESCRIPTION OF EMBODIMENTS

The following describes technical solutions in embodiments of this application with reference to accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

Figure 1:
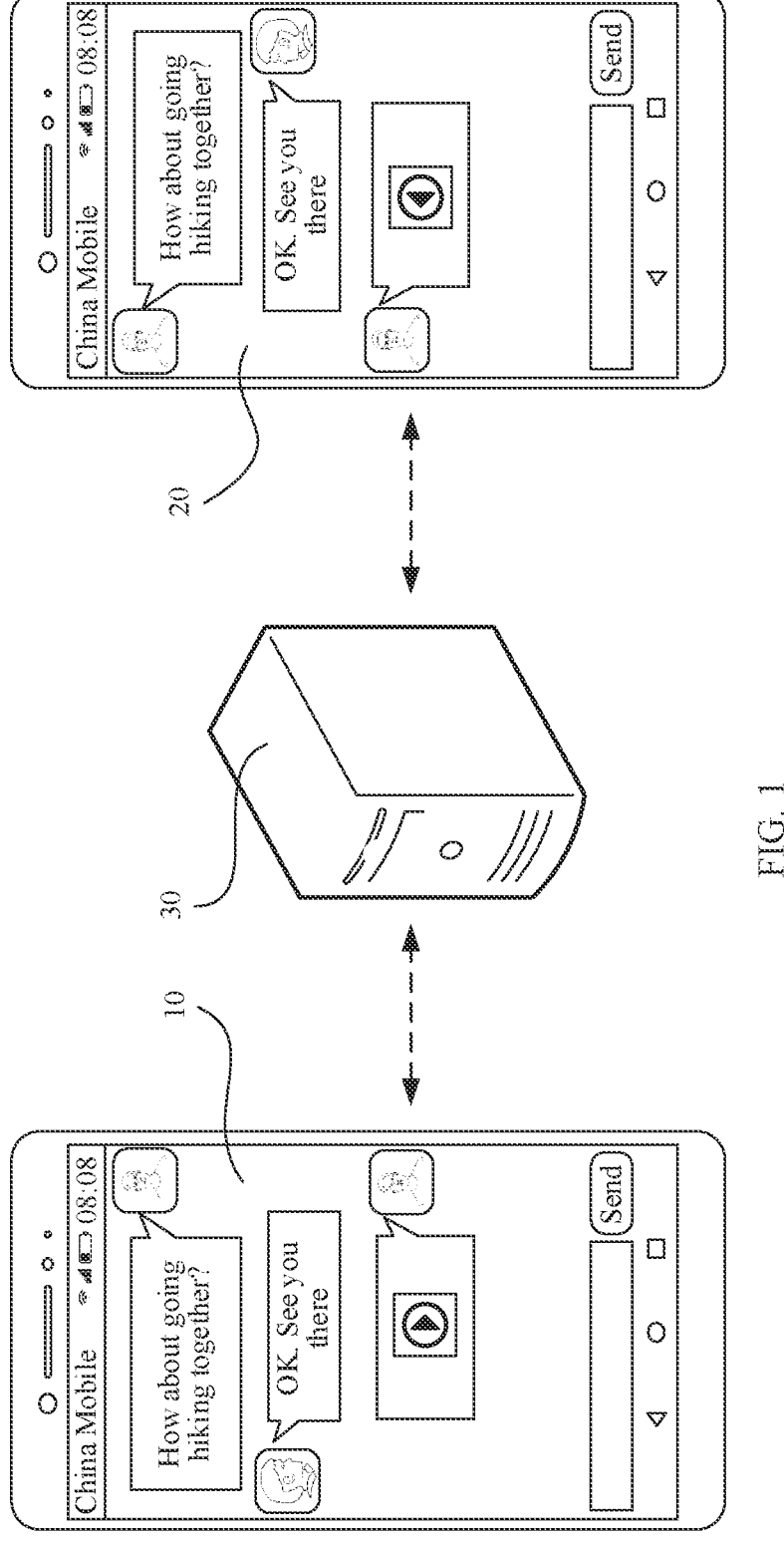
FIG. 1 is a schematic diagram of a system for chat interaction through an IM application in the prior art.

For ease of understanding of embodiments provided in this application, the following first describes a chat interaction method in the prior art with reference to the accompanying drawings. FIG. 1 is a schematic diagram of a system for chat interaction through an IM application in the prior art.

As shown in FIG. 1, the system includes a first terminal 10, a second terminal 20, and an application server 30. The first terminal 10 and the second terminal 20 are in communication connection through the application server 30. Optionally, the first terminal 10, the second terminal 20, and the application server 30 may be connected in a wired manner, or may be connected in a wireless manner.

With the rapid development of the mobile Internet, various instant messaging (instant messaging, IM) applications provide users with timely and rich communication experience. A same IM application may be installed on the first terminal 10 and the second terminal 20 separately. The application server 30 can provide an application service for the IM application, and different users may perform chat interaction through the IM application.

In a possible implementation, different IM applications may be installed on the first terminal 10 and the second terminal 20 separately, and chat interaction may be performed by using different IM applications.

For example, as shown in FIG. 1, a user (denoted as a sender below) may enter a chat message of "How about going hiking together" in the IM application on the first terminal 10, and send the message to the second terminal 20 through the application server 30. Another user (denoted as a receiver below) reads the message in the IM application on the second terminal 20, and replies "OK. See you there" to the sender. The sender may read the message in a display interface of the IM application.

In addition, multimedia information media such as an emoji, an image, a gif, a voice message, and a video may be sent between the sender and the receiver through the IM application, to enrich chat experience.

Generally, these multimedia information media are stored in a memory of the application server 30, and within a specific time period (for example, one week or 15 days), the receiver may download the multimedia information media from the application server 30 through the IM application for watching. After the time limit expires, the server 30 may delete the multimedia information medium from the memory to save storage space. In this case, the receiver cannot download the multimedia information medium from the application server 30 through the IM application.

Figure 2:
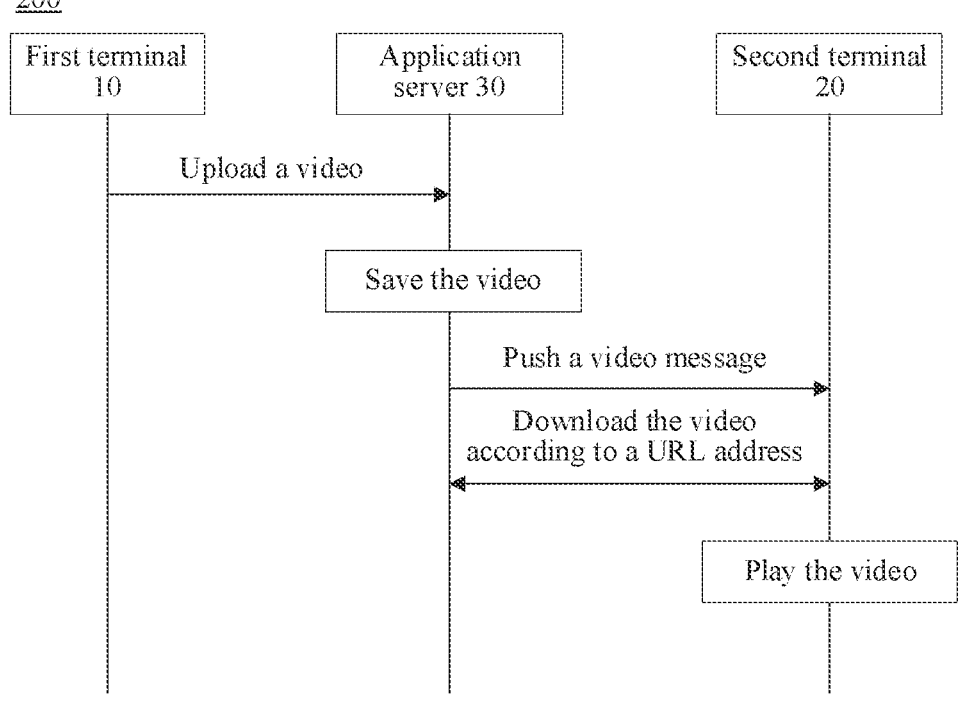
FIG. 2 is a flowchart of sending a video through an IM application in the prior art.

The following uses sending video content as an example for description. FIG. 2 is a flowchart of sending a video through an IM application in the prior art.

As shown in FIG. 1 and FIG. 2, the sender may send a segment of a video to the receiver through the IM application on the first terminal 10. The video may be currently captured (for example, directly captured through the IM application), or may be selected from a gallery or a local memory, or may be forwarded by a video shared by another user.

The video is first uploaded to the application server 30, and the application server 30 caches the video content. In addition, the application server 30 synchronously pushes a corresponding notification message to the second terminal 20, where the notification message carries a uniform resource locator (uniform resource locator, URL) address for storing the video content.

The IM application on the second terminal 20 parses out the URL address of the video content according to the notification message, downloads the video content corresponding to the URL address from the application server 30 to a local disk, and then plays the video by a player of the IM application.

However, most of the foregoing video content is shared by uploading or forwarding pre-made video media, and the video media have basically remained unchanged during transmission. Due to limitations of video content production and semantic irrelevance, the foregoing video content is mainly sent once, and generally has no obvious purpose for contextual communication, and does not obviously facilitate communication between users, resulting in poor communication experience for the users.

In view of this, an embodiment of this application provides a video-based chat interaction method. In the method, text information that a user wants to express is replaced with video content with a same or similar dialog, so that more diversified choices other than a text are added for the user to express, and a video for communication is context-associated, thereby improving communication experience of the user.

Figure 3:
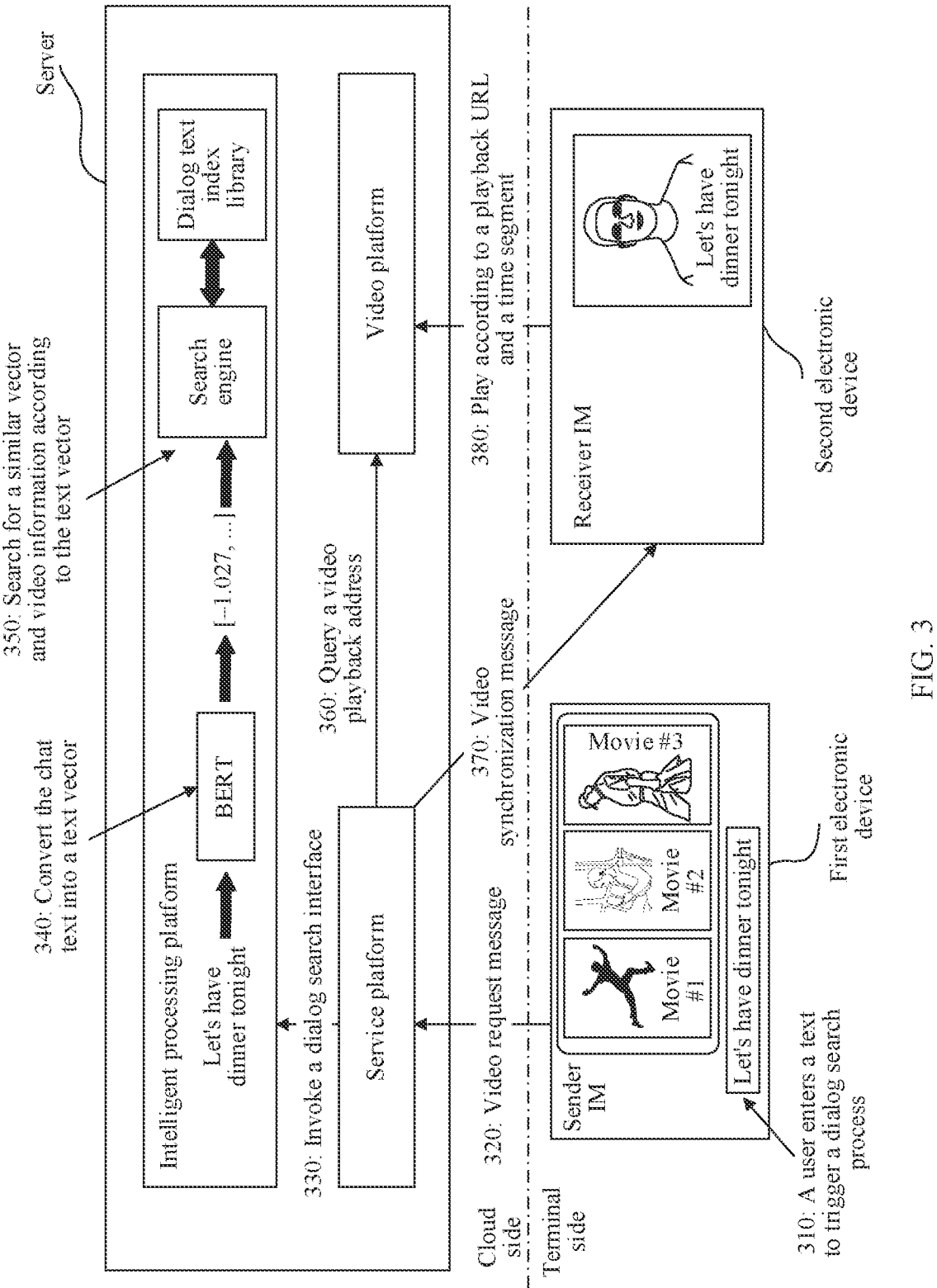
FIG. 3 is an architectural diagram of a system for chat interaction through an IM application according to an embodiment of this application.

The chat interaction method provided in this embodiment of this application may be applied to a chat interaction system provided in FIG. 3. To facilitate description of the chat interaction method provided in this embodiment of this application, the following first describes the chat interaction system.

FIG. 3 is an architectural diagram of a system for chat interaction through an IM application according to an embodiment of this application. As shown in FIG. 3, the chat interaction system includes a first electronic device, a second electronic device, and a server. IM applications are installed on the first electronic device and the second electronic device. The first electronic device and the second electronic device are located on a terminal side, and may be separately in communication connection to a server located on a cloud side by using a wireless network. The server provides IM application services for the first electronic device and the second electronic device.

Different users may perform chat interaction through the IM applications installed on the first electronic device and the second electronic device, for example, send content such as a chat text, a voice message, an image, and a video.

The first electronic device and the second electronic device may be any electronic device that has a communication function, such as a smartphone, a tablet computer, a notebook computer, or a smartwatch. Types of the first electronic device and the second electronic device may be the same or may be different. This is not limited in this application.

For example, both the first electronic device and the second electronic device may be smartphones.

For another example, one of the first electronic device and the second electronic device may be a smartphone, and the other may be a tablet computer.

Figure 4:
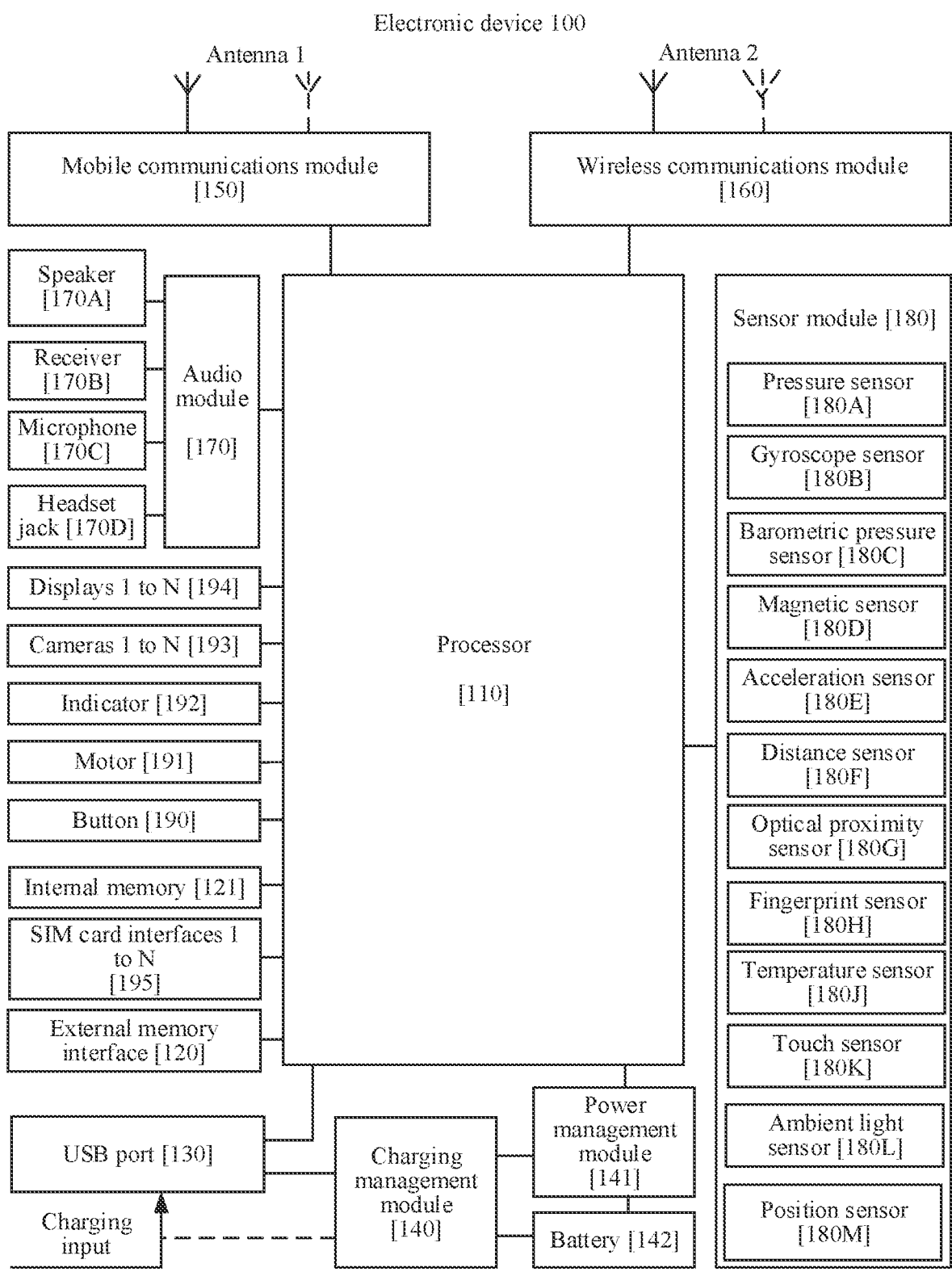
FIG. 4 is a schematic structural diagram of an example of an electronic device according to an embodiment of this application.

In a possible case, the first electronic device and the second electronic device may have some or all hardware structures shown in FIG. 4.

It should be understood that the first electronic device and the second electronic device may be collectively referred to as "electronic devices". Before the chat interaction method provided in this embodiment of this application is described, possible hardware structures and software structures of the first electronic device and the second electronic device are first described.

FIG. 4 is a schematic structural diagram of an example of an electronic device according to an embodiment of this application. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module. SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a position conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that have been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-wire synchronization serial bus, and includes one serial data line (serial data line. SDA) and one serial clock line (derail clock line, SCL). The I2S interface may be configured to perform audio communication. The PCM interface may also be used to perform audio communication, and sample, quantize, and code an analog signal. The UART interface is a universal serial data bus, and is configured to perform asynchronous communication. The bus may be a two-wire communications bus. The bus converts to-be-transmitted data between serial communication and parallel communication. In some embodiments, the UART interface is usually configured to connect the processor 110 to the wireless communications module 160. The MIPI interface may be configured to connect the processor 110 to a peripheral component such as the display 194 or the camera 193. The processor 110 communicates with the display 194 through the DSI interface, to implement a display function of the electronic device 100. The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like.

The USB port 130 is a port that conforms to a USB standard specification, and may be specifically a mini-USB port, a micro-USB port, a USB Type-C port, or the like. The USB port 130 may be configured to connect to a charger to charge the electronic device 100, or may be configured to transmit data between the electronic device 100 and a peripheral device. Alternatively, the port may be configured to connect to a headset for playing audio through the headset. The port may be further configured to connect to another electronic device, for example, an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The power management module 141 is configured to connect the battery 142 and the charging management module 140 to the processor 110. The power management module 141 receives input of the battery 142 and/or the charging management module 140, to supply power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization rates. For example, the antenna 1 may be multiplexed as a diversity antenna of a wireless local area network. In some other embodiments, the antenna may be used in combination with a tuning switch.

The mobile communications module 150 may provide a wireless communication solution that is applied to the electronic device 100 and that includes 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal.

The wireless communications module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division synchronous code domain multiple access (time-division code division multiple access, TD-SCDMA), long-term evolution (long-term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite based augmentation systems, SBAS).

In this embodiment of this application, after the wireless communications module 160 is connected to a base station, signal strength may be displayed by using a signal identifier on a display of the mobile phone. For example, the signal identifier on a mobile phone interface of a user is displayed as five full bars, and may be displayed as four bars, three bars, two bars, one bar, or the like as the signal gradually becomes poor.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, to execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active matrix organic light-emitting diode (active matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diodes, QLED), or the like. In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through lens, and is projected onto a photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. The video codec is configured to compress or decompress a digital video. The electronic device 100 may support one or more video codecs. In this way, the electronic device 100 may play or record videos in a plurality of coding formats, for example, moving picture experts group (moving picture experts group, MPEG) MPEG-1, MPEG-2, MPEG-3, and MPEG-4.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a non-volatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The speaker 170A, also referred to as a "loudspeaker", is configured to convert an audio electrical signal into a sound signal. The electronic device 100 may be used to play music or answer a hands-free call over the speaker 170A. The receiver 170B, also referred to as an "earpiece", is configured to convert an electrical audio signal into a sound signal. When a call is answered or speech information is received through the electronic device 100, the receiver 170B may be put close to a human ear to listen to a voice. The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, identify a sound source, implement a directional recording function, and the like.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. The gyroscope sensor 180B may be configured to determine a moving posture of the electronic device 100. The barometric pressure sensor 180C is configured to measure barometric pressure. In some embodiments, the electronic device 100 calculates an altitude through the barometric pressure measured by the barometric pressure sensor 180C, to assist in positioning and navigation. The magnetic sensor 180D includes a Hall sensor. The acceleration sensor 180E may detect accelerations in various directions (usually on three axes) of the electronic device 100. The distance sensor 180F is configured to measure a distance. The electronic device 100 may measure the distance in an infrared manner or a laser manner. The optical proximity sensor 180G may include, for example, a light-emitting diode (LED) and an optical detector, for example, a photodiode. The light-emitting diode may be an infrared light-emitting diode. The ambient light sensor 180L is configured to sense ambient light brightness. The electronic device 100 may adaptively adjust brightness of the display 194 based on the sensed ambient light brightness. The temperature sensor 180J is configured to detect a temperature. In some embodiments, the electronic device 100 executes a temperature processing policy through the temperature detected by the temperature sensor 180J.

The fingerprint sensor 180H is configured to collect a fingerprint. The electronic device 100 may use a feature of the collected fingerprint to unlock the device, access an application, shoot, and answer a call with fingerprint. The touch sensor 180K is also referred to as a touch panel. The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194.

In this embodiment of this application, the position conduction sensor 180M may obtain location information of the electronic device, and convert the location information into an available output signal. For example, for the mobile phone, the position sensor 180M may be a global positioning system (global positioning system, GPS) sensor, and may determine longitude and latitude coordinates of the electronic device. This is not limited in this embodiment of this application.

The button 190 includes a power button, a volume button, and the like. The button 190 may be a mechanical button or a touch button. The electronic device 100 may receive a button input, and generate a button signal input related to a user setting and function control of the electronic device 100.

In this embodiment of this application, for a portable device such as a smartwatch, the user may perform a shortcut operation by pressing a mechanical button, for example, to enable a function of the smartwatch.

The motor 191 may generate a vibration prompt. The motor 191 may be used for an incoming call vibration prompt, or may be used for a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, a received message, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card.

It should be understood that the first electronic device and the second electronic device, as the electronic devices, may include all the hardware structures described above, or include some of the foregoing hardware structures, or have more other hardware structures that are not listed above. This is not limited in this embodiment of this application.

It should be further understood that the first electronic device and the second electronic device, as the electronic devices, may use software systems such as a layered architecture, a HarmonyOS (HarmonyOS) architecture, an event-driven architecture, a microkernel architecture, a microservice architecture, or a cloud architecture.

The foregoing describes possible hardware structures of the first electronic device and the second electronic device. The following describes a possible software structure by using an Android® system in which the first electronic device and the second electronic device have a layered architecture as an example.

Figure 5:
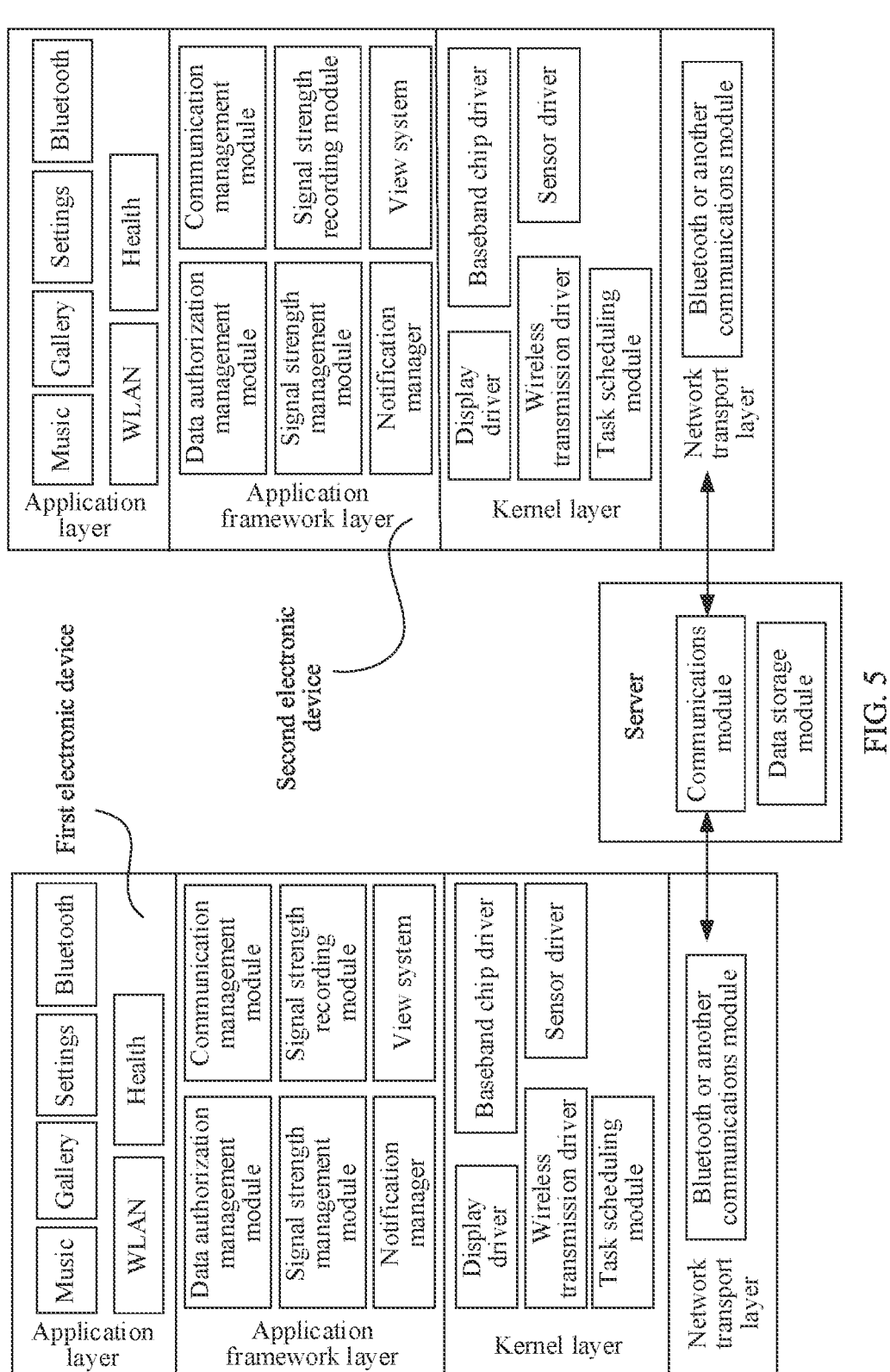
FIG. 5 is a software structural block diagram of each unit in the system architecture shown in FIG. 3.

FIG. 5 is a software structural block diagram of each unit in the system architecture shown in FIG. 3.

In a layered architecture, software is divided into several layers, and each layer has a clear role and task. The layers communicate with each other through a software interface. In some embodiments, the Android® system is divided into four layers: an application layer, an application framework layer, a kernel layer, and a network transport layer from top to bottom.

A series of application packages may be included on the application layer.

In this embodiment of this application, both the first electronic device and the second electronic device may be smartphones, and have a same software structure. The following uses a software structure of the first electronic device as an example for description.

As shown in FIG. 5, an application package of an application layer of the first electronic device may include applications (application, APP) such as music, a gallery, settings, health, Bluetooth, WLAN, and an IM application. For example, the IM application may display a related icon and interface on a display interface of the first electronic device, and send a chat message to the second electronic device through the server.

The application framework layer provides an application programming interface (application programming interface, API) and a programming framework for an application at the application layer. Some predefined functions may be included on the application framework layer.

As shown in FIG. 5, the application framework layer of the first electronic device may include a data authorization management module, a communication management module, a signal strength management module, a signal strength recording module, a view system, a notification manager, and the like.

The data authorization management module may be configured to manage data permissions of the first electronic device that can be accessed by the server. The view system may be configured to construct an application. A display interface may include one or more views. For example, a display interface that includes SMS notification icons may include a text display view and an image display view.

The notification manager enables an application to display notification messages in a status bar, and may be used to convey a message of a notification type to a user. The message may disappear automatically after a short pause without user interaction. For example, the notification manager is used to notify the user that the download is finished, and a corresponding message reminder is sent. Alternatively, the notification manager may be a notification that appears in a top status bar of a system in a form of a graph or a scroll bar text, or may be a notification that appears on the screen in a form of a dialog window. For example, prompt text information is displayed in a status bar of the first electronic device, or the first electronic device gives an alert tone or vibrates, or an indicator is flashed.

The kernel layer is a layer between hardware and software.

As shown in FIG. 5, the kernel layer of the first electronic device includes at least a display driver, a baseband chip driver, a wireless transmission driver, a sensor driver, a task scheduling module, and the like.

The network transport layer may be used for communication, data transmission, and the like between different devices. For example, for a Bluetooth module, a Bluetooth channel is established between the first electronic device and the second electronic device, and data, a message, an instruction, or the like is transmitted through the Bluetooth channel. Details are not described herein.

The server may include at least a communications module and a data storage module. The communications module is configured to implement communication between the first electronic device and the second electronic device. The data storage module may be configured to store data uploaded by the first electronic device and the second electronic device. For example, the first electronic device may upload video content to the server by using a wireless communications network. The data storage module of the server may store the video content for the second electronic device to download.

With reference to an implementation process of this embodiment of this application, the foregoing describes functional modules that may be included in the first electronic device, the second electronic device, and the server. It should be understood that the first electronic device, the second electronic device, and the server may include more or fewer functional modules shown in FIG. 5. This is not limited in this embodiment of this application.

With reference to FIG. 3, the following further describes in detail a server provided in an embodiment of this application. As shown in FIG. 3, in this embodiment of this application, the server includes a video platform, a service platform, and an intelligent processing platform that are interconnected and coordinate to work with each other. The following describes functions implemented by each platform.

(1) Video Platform

The video platform stores a large number of video files. Each video file contains subtitles (subtitles of motion picture) that match images. The video file may be, for example, a movie, a TV series, an entertainment video, a variety show video, an animation, and a documentary.

The subtitle herein refers to non-image content displayed in a text form, for example, a dialog in television, movie, and stage productions, and also generally refers to a text post-processed in film and television productions. The subtitle also refers to a caption that appears at the bottom of the film screen or TV screen and various texts, such as a film title, a cast and crew list, lyrics, dialogs, and description words with an introduction to characters, place names, and chronology. The subtitle of the film and television production generally appears at the bottom of the screen, while the subtitle of a dramatic work may be displayed on both sides or above the stage. In this embodiment of this application, the subtitle is mainly a dialog (also referred to as a line).

The subtitle of the video file herein may be an embedded subtitle of the video, or may be an external subtitle. This is not limited in this application.

For example, the external subtitle may be a subtitle file in a text format (subRip text, SRT). In addition, the external subtitle may alternatively be a subtitle file in a text format such as smi, ssa, or lrc. This is not limited in this application.

The subtitle may be in Chinese, or may be in any other language such as English, Russian, Japanese, French, or German. This is not limited in this application.

The subtitle is recorded in a form of time stamps, so that a corresponding text can be displayed on a player interface at a specified time. A time segment formed between a time stamp (denoted as a start time stamp below) when a dialog just appears or is about to appear and a time stamp (denoted as an end time stamp below) when a line disappears is a time segment location of the dialog in a corresponding video.

The video content of the video file that is extracted between the start time stamp and the end time stamp may form a video clip. In this case, the extracted video file may be referred to as a complete video. It is easy to understand that each video file usually has a plurality of dialogs, and a plurality of video clips may be extracted from the complete video. On the contrary, the complete video can be formed by splicing the plurality of video clips.

The massive video files may be stored in a memory of the video platform by indexes. A unique video identity (Identity, ID) is allocated to each video file, and a storage address (or a playback address) of the video file can be indexed by using the video ID.

In a possible implementation, the video platform further stores a promotion poster corresponding to the video file, and a link (that is, a download address of the promotion poster) of the video file can be further indexed by using the video ID.

The video platform is configured with a service-oriented interface for providing an external service. A valid requester (for example, the service platform described below) can obtain metadata information such as the video ID, the playback address, and the subtitle file of the video file through the service-oriented interface.

The valid requester may further download the video file from the cloud side to an IM client (for example, the second electronic device) on the terminal side by using the service-based interface according to the video ID and/or the playback address of the video file.

In this embodiment of this application, the valid requester may further download, according to the playback address and the specified time segment, a video clip including a specific dialog text. Specifically, the video content that is in the specified time segment of the video file and that is stored in the playback address is a video clip that the valid requester wants to download, and the video clip may be extracted according to the playback address and the specified time segment, so that the valid requester (for example, the first electronic device and/or the second electronic device) at the terminal side can download the video clip. It is a basic capability of the video platform to provide a media stream (that is, a video clip) according to the playback address and the specified time segment, which is widely applied and fully disclosed in an existing solution. Details are not described herein in this application.

(2) Intelligent Processing Platform

The intelligent processing platform provides two functions. One is to perform pre-processing, to create a dialog text index library, and the other function is to match an entered chat text with a dialog text in the dialog text index library.

The dialog text index library includes a mapping relationship between a dialog text and a video clip that includes the dialog text. In this embodiment of this application, considering a calculation amount, each video file may not be directly segmented into a plurality of video clips according to dialog texts. Therefore, the dialog text index library provided in this embodiment of this application may include a correspondence between a dialog text and a video file (which may also be referred to as a complete video), and a correspondence between the dialog text and a time segment location of the dialog text in the complete video.

In other words, the intelligent processing platform provides two service interfaces for an external system: One is a dialog index creation interface. The dialog index creation interface requests a dialog text, and outputs a video file (a video ID) corresponding to the dialog text and a time segment location of the dialog text in the video file.

For a video file with embedded subtitles, each dialog text may be extracted from the video file. The subtitle of the video file may alternatively be an external subtitle. In this case, a corresponding dialog text may be directly extracted from the corresponding external subtitle file (for example, an SRT file). The pre-extracted dialog text may be used by the foregoing dialog index creation interface.

The intelligent processing platform may implement the foregoing functions by using a trained artificial intelligence (artificial intelligence, AI) model. Therefore, in some cases, the intelligent processing platform may also be referred to as an AI platform. In the following, for brevity, the intelligent processing platform is referred to as an AI platform.

The AI platform uses a natural language processing (natural language processing, NLP) technology. A natural language semantics understanding model provides a capability of encoding a sentence (for example, a dialog text) into a vector of a fixed length. The dialog text vector is used as an index, and a result of the index is a video ID corresponding to the dialog text and a time segment location of the dialog text in the video file.

To be specific, in this embodiment of this application, the AI platform first converts the dialog text into the dialog text vector, and establishes a mapping relationship between the dialog text vector and the video clip. In other words, the dialog text in the dialog text index library exists in a form of a text vector.

Another function of the AI platform is to match (that is, search) the chat text entered by the valid requester with the dialog text in the dialog text index library. A successfully matched dialog text (which may also be referred to as a target dialog text) and the chat text have same or similar semantics. In this case, a video clip corresponding to the target dialog text may be further referred to as a target video clip.

In other words, another external service interface of the AI platform is a dialog search interface. After receiving an interface request, the AI platform still uses the natural language semantics understanding model to encode the chat text uploaded by the user into a text vector, and then calculates the Euclidean distance based on the vector index library to implement efficient text vector search. The dialog text that is most approximate to the semantics searched based on the text vector can be returned in seconds, and the corresponding video ID and the time segment location can be determined based on the text index library. In other words, the target video clip corresponding to the chat text is determined.

The Euclidean distance herein is also referred to as a Euclidean metric (euclidean metric), which is a commonly used definition for a distance, and refers to a real distance between two points in a multi-dimensional space, or a natural length of a vector (that is, a distance from the point to an origin). A Euclidean distance in two-dimensional or three-dimensional space is an actual distance between two points. In this embodiment of this application, a smaller Euclidean distance indicates that semantics of the chat text and the dialog text are closer.

Specifically, the AI platform may first convert, by using the natural language semantics understanding model, the chat text uploaded by the user into a chat text vector, then calculate a relative distance (that is, a Euclidean distance) between the chat text vector and the dialog text, determine a dialog text corresponding to the dialog text vector whose relative distance to the chat text vector is less than a preset threshold as a target dialog text, and determine a video clip corresponding to the target dialog text as a target video clip. The preset threshold herein may be obtained according to an empirical value, for example, obtained after modification according to big data.

It is easy to understand that a smaller relative distance between the chat text vector and the dialog text vector indicates a higher matching degree between the chat text and the dialog text, that is, closer semantics. For example, w % ben the distance between the chat text vector and the dialog text vector is 0, it indicates that the chat text and the dialog text are completely matched, and in this case, semantics of the chat text and the dialog text are the same.

(3) Service Platform

The service platform obtains a subtitle file corresponding to a video file from the video platform, parses the subtitle file, extracts each dialog from the subtitle file, and invokes the dialog index creation interface of the AI platform to create an index for each dialog and generate a dialog text index library.

Specifically, the service platform may periodically request the video platform to download subtitle files corresponding to massive videos. Because there are too many videos, a plurality of filtering conditions may be used during synchronization and a policy of downloading subtitle files in batches may be implemented. For a video file with embedded subtitles, the service platform can extract and download a subtitle file from the video file. For a video file with external subtitles, the external subtitles can be directly downloaded.

Once the external subtitles are downloaded, dialogs can be extracted in a format of the subtitle file. For example, a subtitle file in an SRT format may be parsed according to a rule of the SRT file format, the interface from the AI platform is cyclically invoked according to each dialog text extracted from the SRT file, and each dialog text is recorded into the dialog text index library of the AI platform.

When a user sends a chat text request, the service platform invokes the dialog search interface of the AI platform to determine a dialog text whose semantics are closest to the chat text and the video ID corresponding to the dialog text. Then, the service platform queries the video platform for related metadata information such as a playback address and a video poster link according to the video ID.

Finally, the service platform returns content such as the target dialog text, the playback address, information about a time segment location, and the video poster link to an IM client. The IM client may download and display a successfully matched target video clip to the user according to the foregoing information.

For example, the IM client may display, on a display, the target dialog text corresponding to the target video clip to the user, and after the user confirms that the target dialog text can accurately express what the user wants to mean (or meaning), the user may download the target video clip for preview for further confirmation.

For another example, the target video clip may also be directly downloaded according to the playback address and the time segment location for playback preview.

For another example, a poster of the target video clip may be downloaded and displayed according to the video poster link. The poster has a publicity function and can reflect basic content of the target video clip. After the user preliminarily confirms that the target video clip corresponding to the poster may express what the user wants to mean, the user may further download the target video clip for preview confirmation.

The foregoing content describes respective functions of the three platforms of the server. The foregoing three platforms can provide application services for the IM client. The following continues to describe how the IM client exchanges information with the server to implement the foregoing application service.

After the user enters a chat text, the IM client (for example, the first electronic device in FIG. 3) determines to initiate, if an idle duration exceeds a preset duration, for example, 100 ms (that is, the user does not input another operation instruction in the time segment), a video query request carrying the chat text to the service platform. The service platform returns a response message to the IM client, where the response message includes a list of queried target video clips. The IM client may display the target video clip according to the response message, for example, display at least one of a video name of the target video clip (that is, a name of a complete video corresponding to the target video clip), a poster, a dialog text, or content of the target video clip.

In a possible implementation, the user may manually enable a video chat mode of the IM application, and after the user enters a chat text, the user directly initiates the video query request to the service platform without waiting for the preset duration.

In another possible implementation, after the user enters a chat text, the user may input a related control instruction (for example, double-click or click a specific virtual button) on a touchscreen. After receiving the instruction, the IM client initiates the video query request to the service platform.

In another possible implementation, the user may enter a voice message through the IM application. In this case, the IM application may first identify the voice message, identify the voice message as a chat text, and then initiate the video query request to the service platform according to the chat text.

The service platform returns a matching result to the IM client. If a quantity of queried target video clips is greater than or equal to 1, the IM client parses the response message, extracts information about a poster, a playback address, and a time segment location corresponding to a dialog text of the target video clip, and presents the information to the user for selection in a form of a list.

In a possible implementation, the IM client may first display a dialog text and/or a poster of each target video clip, and after determining that the user needs to preview the target video clip, may download content of the target video clip from the video platform by using a playback address and information about a time segment location corresponding to the dialog text.

In another possible implementation, the response message further includes a video name (that is, a name of a complete video corresponding to the target video clip). In this case, the IM client may further display the video name to the user.

The IM client presents a plurality of target video clips to the user for selection in a form of a list. Optionally, the IM client may display a maximum of three records, and rank a video with a highest matching degree higher on the list. In this case, the response message may further include information about matching degrees between the plurality of target video clips and the chat text.

For example, as shown in FIG. 3, the response message carries three target video clips in total, namely a movie #1, a movie #2, and a movie #3, and matching degrees are respectively 100%, 90%, and 85%. In this case, the foregoing three videos may be displayed on the display from left to right.

In a possible implementation, if the query result is null (that is, there is no successfully matched video clip), nothing is displayed, and the user may directly send the text.

In a possible implementation, in addition to matching a video with the chat text, content such as an image and an emoji may also be matched. In this case, the IM client may allow the user to prioritize policies of matching the chat text with the video, the image, or the emoji.

The user may select a target video clip from the video list for preview, and when it is confirmed that content played in the target video clip can express what the user currently wants to mean, the user may click to send the video. In this case, the chat text is replaced with the target video clip.

When receiving a message synchronized by the service platform, a receiver IM client (for example, the second electronic device in FIG. 3) parses out a video playback address and information about a time segment location included in the message, downloads the target video clip and starts a local player to play the target video clip, so that the video clip selected by the sender can be played from a specified location, and the playback stops after the automatic playback is completed, and the playback may be repeated by manually clicking.

Optionally, a receiver user may download, through an instruction by double-clicking the target video clip, a video client matching the video platform to watch the corresponding complete video.

The following further describes the chat interaction method provided in this embodiment of this application with reference to a specific example in FIG. 3. As shown in FIG. 3, the chat interaction method provided in this embodiment of this application includes the following steps.

Step 310: A sender enters a chat text in an IM application installed on a first electronic device, to trigger a dialog text search process. For example, a user may enter a chat text of "Let's have dinner tonight" in an input box, and a dialog text search process is triggered when it is determined that the user does not input a new instruction within a preset duration.

Step 320: The first electronic device sends a video request message to a service platform of a server on a cloud side, where the message carries the chat text, to request a target video clip that matches the chat text.

Step 330: The service platform of the server invokes a dialog search interface of an AI platform. In this case, the service platform sends the chat text (for example, "Let's have dinner tonight") to the AI platform.

Step 340: The AI platform converts the chat text into a chat text vector by using a natural language semantics understanding model.

Step 350: The AI platform searches, by using a search engine, a dialog text vector similar to (that is, matching) the chat text vector from a dialog text index library, determines a dialog text corresponding to the dialog text vector whose relative distance to the chat text vector is less than a preset threshold as a target dialog text, and determines a video clip corresponding to the target dialog text as the target video clip.

The AI platform returns, to the service platform, a video ID corresponding to the target dialog text and information about a time segment location of the target dialog text in a video file.

Step 360: The service platform queries a video platform for related metadata information such as a playback address and a video poster link of the video according to the video ID. Then, the service platform returns a response message to the first electronic device, where the response message includes a list of queried target video clips. The first electronic device may display the target video clip according to the response message, for example, display at least one of a video name of the target video clip (that is, a name of a complete video corresponding to the target video clip), a poster, a dialog text, and the like.

For example, the first electronic device may display names (the movie #1, the movie #2, and the movie #3) and promotion posters of the target video clips to the user on a display. After receiving a download instruction (for example, clicking a poster) from the user, the first electronic device downloads and plays content of the video clip according to the playback address and the time segment location of the video.

In a possible implementation, the first electronic device may also automatically download content of a video ranked the highest (that is, a video with the highest matching degree, for example, the movie #1 in FIG. 3) in a video list, to provide convenience for the user to preview.

When the user confirms that content played in one of the plurality of target video clips (denoted as a first video clip below) can express w % bat the user currently wants to mean, the user may click to send the target video clip. After receiving a confirmation instruction from the user, the first electronic device sends a video playback message to the service platform of the server, to indicate the server to send the first video clip to a second electronic device.

Step 370: The service platform of the server sends a video synchronization message to the second electronic device, where the video synchronization message carries a download address and information about a time segment location of the first video clip.

In step 380, the second electronic device downloads the first video clip from the video platform of the server according to the download address and the information about a time segment location of the first video clip, and plays the first video clip. As shown in FIG. 3, the first video clip includes the dialog text of "Let's have dinner tonight".

In this embodiment of this application, text information that the user wants to express is replaced with video content with a same or similar dialog, so that more diversified choices other than a text are added for the user to express, and a video for communication is context-associated, thereby improving communication experience of the user. In addition, this application also provides a more novel and interesting interactive experience for an entertainment scenario of instant messaging.

For example, a user #1 wants to communicate with a user #2 through an IM application. After the user 1 enters a chat text in an input box of the IM application, the IM application provides the user #1 with an option of a matched video clip based on an understanding of content of the chat text. After the user #1 selects the option, the chat text may be presented to the user #2 by using a scene in the video clip, and the user #2 may also reply to the user #1 by using the video clip in a same manner. In this way, the video clip for communication is context-associated, and the communication experience of the user can be improved.

Compared with a conventional chat interaction method in which communication can only be performed by using a text, a voice message, or the like, in this embodiment of this application, a capability of quickly matching a user's intention with a video dialog can be achieved according to a text-based vector representation and an efficient search capability, and the user may select rich video content to express a meaning that the user wants to express to another user, thereby ensuring fun and diversity.

Figure 6:
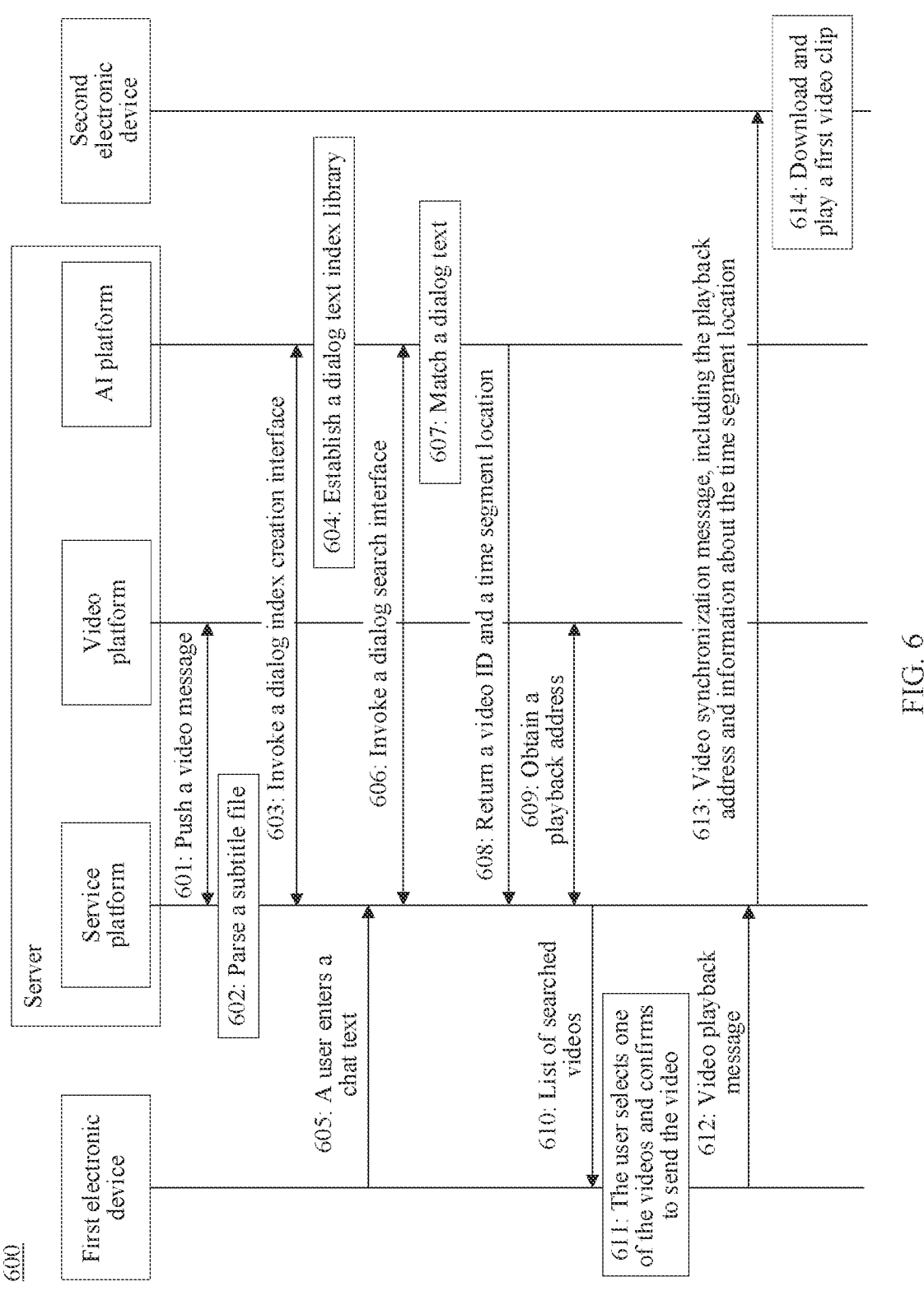
FIG. 6 is a flowchart of an example of a chat interaction method according to an embodiment of this application.

The following further describes, with reference to a specific embodiment, the video-based chat interaction method provided in this embodiment of this application. FIG. 6 is a flowchart of a chat interaction method 600 according to an embodiment of this application. As shown in FIG. 6, the method 600 includes the following steps.

Step 601. A service platform periodically initiates a request for obtaining video metadata to a video platform according to an agreement with the video platform, where the video metadata request is used to request information such as a subtitle file of a video file. After receiving the request, the video platform queries a local database for video metadata records available for a dialog search scenario, such as a video ID, a video title, a video length, a video poster link, a video subtitle file, and other basic data, and sends the basic data to the service platform. For a metadata request after initialization, the video platform may return only basic data such as a video subtitle file of a currently added video file to the service platform.

Step 602: After receiving a list of the video metadata, the service platform stores the related basic data, downloads an SRT subtitle file, and parses a dialog text of each sentence in the SRT subtitle file according to an SRT subtitle format.

Step 603: The service platform may cyclically invoke a dialog index creation interface of an AI platform according to each dialog text. In this way, each dialog text is recorded into a dialog text index library of the AI platform.

When initiating a dialog index creation request to the AI platform, the service platform carries information such as each dialog text, a time segment location of the dialog text corresponding to the dialog, and a video ID, so that the AI platform establishes a corresponding index relationship between the dialog text and the video ID, and a corresponding index relationship between the dialog text and the time segment location of the dialog text.

Further, the AI platform may first convert the dialog text into a dialog text vector, and then establish an index relationship between the dialog text vector and the video ID corresponding to the dialog text, and an index relationship between the dialog text vector and a time segment location of the dialog text in the video file.

Step 604: The AI platform stores an index relationship between a dialog text vector of each sentence and a video ID and a time segment location, to establish the dialog text index library. It can be learned from the foregoing content that, in the dialog text index library, the dialog text exists in a form of a text vector.

Specifically, after receiving a dialog index creation request, the AI platform formats each dialog text, and then encodes the dialog text based on a natural language semantics understanding model, to generate a high dimensional vector for the dialog text.

After the text vector is generated, the text vector is stored in the dialog text index library of the AI platform, and basic metadata information that is synchronously stored and associated with the dialog text vector includes: information such as a video ID corresponding to the dialog text, a time segment location of the dialog text, a video name, and a video poster link. The AI platform sends a response to the service platform, indicating that a dialog index is successfully created.

Step 605: When a user #1 enters a chat text in an IM application on a first electronic device, before sending the chat text to a second electronic device to which a user #2 belongs, the first electronic device determines whether the current user is idle for more than a preset duration (for example, 100 ms), and triggers a video matching process when the time expires. The first electronic device sends the chat text to a dialog matching interface of the service platform, and waits for a response from the service platform.

In a possible implementation, the user #1 may enter a voice message in the IM application on the first electronic device, and the first electronic device may identify, according to an automatic speech recognition (automatic speech recognition, ASR) technology, the voice message entered by the user as a chat text, and then perform a corresponding video matching procedure.

Step 606: The service platform receives the chat text in the dialog matching interface sent by the first electronic device, and sends a request message to a dialog search interface of the AI platform, where the request message carries the chat text.

Step 607: The AI platform performs matching of the dialog text according to the chat text.

Specifically, the AI platform receives the dialog search interface sent by the service platform, parses out the chat text, encodes the chat text into a vector by using a natural language semantics understanding model, and generates a high dimensional chat text vector. Then, the AI platform matches the chat text vector with all dialog text vectors in the dialog text index library, searches for a dialog text vector whose semantics are closest to that of the chat text expressed by the user #1, and associates and searches for a video ID, a time segment location, a video name, and a video poster link corresponding to the dialog text vector.

Step 608: The AI platform packs the dialog text vector and data such as a video ID, a time segment location, a video name, and a video poster link corresponding to the dialog text vector, and returns the data to the service platform by using a response message. In other words, the AI platform sends a successfully matched target video clip to the service platform.

Step 609: After receiving the response message, the service platform parses out the video ID, and requests a real video playback address from the video platform according to the video ID.

Step 610: The service platform combines the data such as the video name, the video poster link, the video playback address, and the time segment location of the dialog in the video into a video list, and returns the video list to the first electronic device by using the response message of the dialog matching interface.

Step 611: After receiving the response message, the first electronic device pops up a dialog box, where there are several video lists in the middle for the user #1 to preview and select, and the previewed video clip should be a dialog representation with the closest semantics to the chat text or words (voice messages) that the user #1 wants to send. The user selects a satisfactory video clip and clicks to send the video clip.

Step 612: The first electronic device sends a video playback message to the service platform, where the video playback message is used to indicate the service platform to send a selected video clip (that is, a first video clip) to the second electronic device.

Step 613: The service platform sends a video synchronization message to the second electronic device, where the sent message includes a video name, a video poster link, a video playback address, and a time segment location of the dialog in the video.

Step 614: Based on a default process of pushing and receiving an IM application message, after receiving the notification message, the second electronic device pops up a player window in an interaction window, creates a player instance, and transfers the playback address and the time segment location to the player, and the player downloads, according to a specified time segment location, the first video clip to decode and render a video stream in real time. The video watched by the user #2 is what the user #1 wants to express, and is presented only through the dialog in the video.

The following describes the chat interaction method provided in this embodiment of this application by using a specific actual example.

In a scenario, a user #1 wants to chat with a user #2 based on video content, and the chat content is an invitation of "How about going hiking together" sent by the user #1 to the user #2.

1. The service platform periodically sends a request for obtaining video metadata to the video platform. The video metadata is a prerequisite of normal operation of a system.

2. After receiving the request, the video platform queries a local database for video metadata records available for a line search scenario, such as a unique video ID, a video title, a video length, a video poster link, and other basic data, and sends the record list to the service platform. There are two film and TV series, namely a movie #1 and a TV series #1, which respectively contain two lines: "How about going hiking together" and "Let's go to the sea".

3. The service platform searches for several metadata lists from the video platform, including basic data of the movie #1 and the TV series #1, stores the basic data, and downloads SRT subtitle files related to the two works. The service platform can parse out time segment locations corresponding to the two sentences in a dialog text as follows:

Movie #1 SRT subtitle file excerpt
00:08:20,422→00:08:22,794
How about going hiking together
TV series #1 SRT subtitle file excerpt
00:13:11,324→00:13:13,194
Let's go to the sea When initiating a dialog index creation request to the AI platform, the service platform carries each dialog text, for example, "How about going hiking together" and basic information such as the video subtitle time segment 00:08:20,422→00:08:22,794, a unique video ID, a video name, and a video poster link corresponding to the dialog.

4. When receiving the dialog index creation request, the AI platform formats each dialog text, and then encodes the dialog text based on a natural language semantics understanding model, to generate two high dimensional vectors for the two dialog texts: "How about going hiking together" and "Let's go to the sea".

The vectors are stored in the dialog text index library of the AI platform, and basic metadata information that is synchronously stored and associated with the vector includes: a video subtitle time segment 00:08:20,422->00:08:22,794 corresponding to the dialog, a unique video ID, a video name, a video poster link, and the like. The AI platform sends a response to the service platform, indicating that a dialog index is successfully created. Till now, preparations for the system are complete.

5. When the user #1 enters a text of "How about going hiking together" on the first electronic device, the first electronic device sends the text to a dialog matching interface of the service platform.

6. The service platform receives the text of "How about going hiking together" in the dialog matching interface sent by the first electronic device, and sends a request to a dialog search interface of the AI platform, where the request carries the text.

7. The AI platform receives the dialog search interface sent by the service platform, parses the text of "How about going hiking together", encodes the text into a vector by using the natural language semantics understanding model, and generates a high dimensional vector. Then, the AI platform matches the vector with all vectors in the index library, and searches for a line vector that is most similar to what the user wants to express. In this example, the text of "How about going hiking together" has a higher confidence and ranks the highest. In addition, some similar sentences or expressions are matched. For example, the sentences or expressions are listed behind and returned to the user for more choices. The data such as the corresponding video subtitle time segment 00:13:11,324->00:13:13.194, the unique video ID, the video name, and the video poster link is packed and returned to the service platform by using a response message.

8. After receiving the response message, the service platform parses out the unique video ID, and requests a real video playback address from the video platform according to the ID. For example, the video playback address is:

http://video-cn.bankcdn.cn/P_VT/video_cutover/AA/v3/349EB5E23516885312/277018.mpd.

9. The service platform combines the data such as the video name, the video poster link, the video playback address, and the time segment location of the dialog in the video, and returns the data to the first electronic device by using the response message of a dialog matching interface.

10. After receiving the response message, the first electronic device automatically pops up a dialog box, where a video list including a movie #1 and a TV series #1 is available for the user to preview and select. After previewing, the user selects the movie #1 and taps to send.

11. The sent message includes the video name, the video poster link, the video playback address, and the dialog time segment 00:13:11,324->00:13:13.194. Based on a default process of pushing and receiving an IM message, after receiving the notification message, the second electronic device of the user #2 pops up a player window in an interaction window, creates a player instance, and transfers the playback address and the time segment location to the player. The player downloads, according to a specified time segment location, clips to decode and render a video stream in real time. The video watched by the user #2 is what the user #1 wants to express, and is presented only through the dialog in the video.

Figure 7:
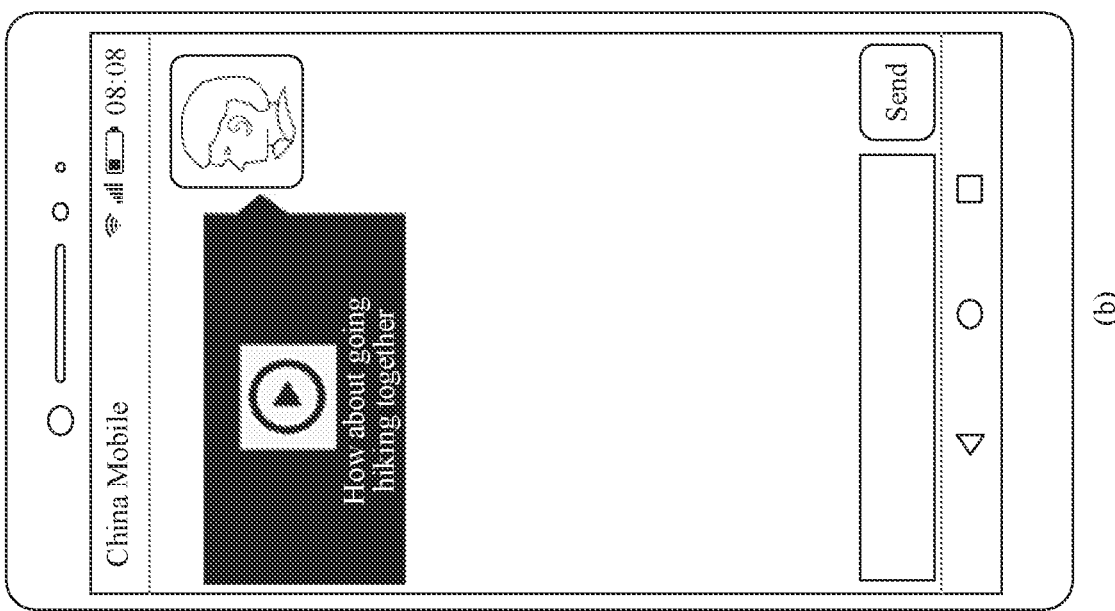
FIG. 7 is a diagram of an interactive interface between an IM application and a user according to an embodiment of this application.
Figure 7:
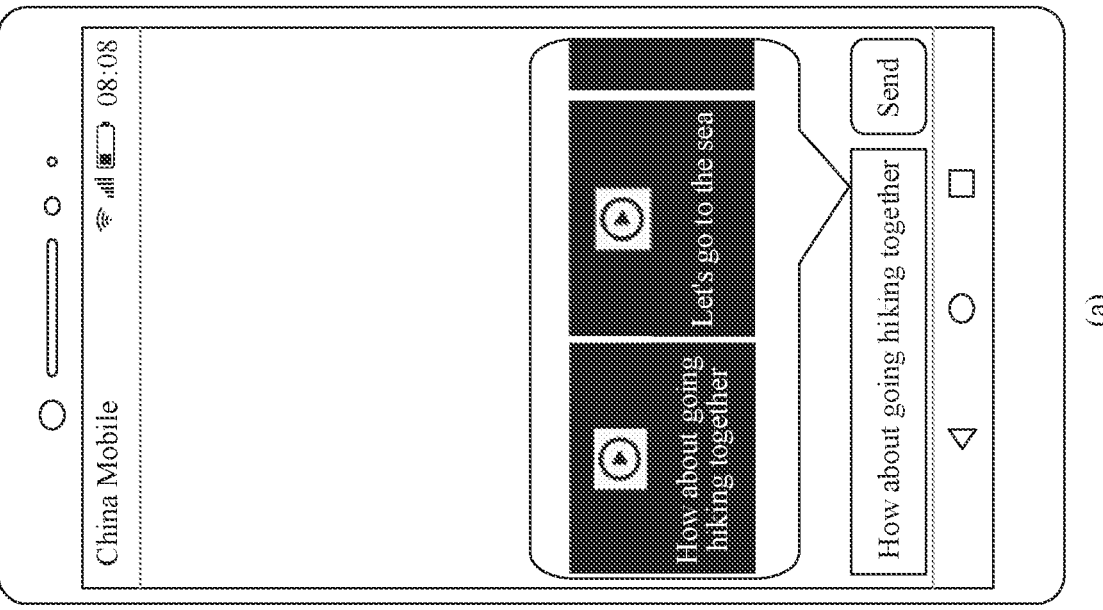

FIG. 7 is a diagram of an interactive interface between an IM application and a user according to an embodiment of this application. As shown in FIG. 7(a), a user #1 wants to initiate an invitation of "How about going hiking together" to a user #2, an IM application on a first electronic device provides the user #1 with an enhancement capability of video content with a dialog, searches for the most similar dialog according to a chat text, and displays a video clip to which the dialog belongs to the user #1 through a pop-up window for selection. After previewing video clips provided by a server, the user #1 selects a video with the closest semantics and clicks to send the video. A second electronic device of the user #2 may receive a playback address message, as shown in FIG. 7(b), and may directly play, through an IM application installed on the second electronic device, the video clip with "How about going hiking together" selected by the user #1.

Compared with a conventional chat interaction method, in this embodiment of this application, the dialog of the video content that highly matches a user's intention is used to replace text content that the users want to communicate with each other, thereby providing richer communication materials and interesting audio-visual experience.

Figure 8:
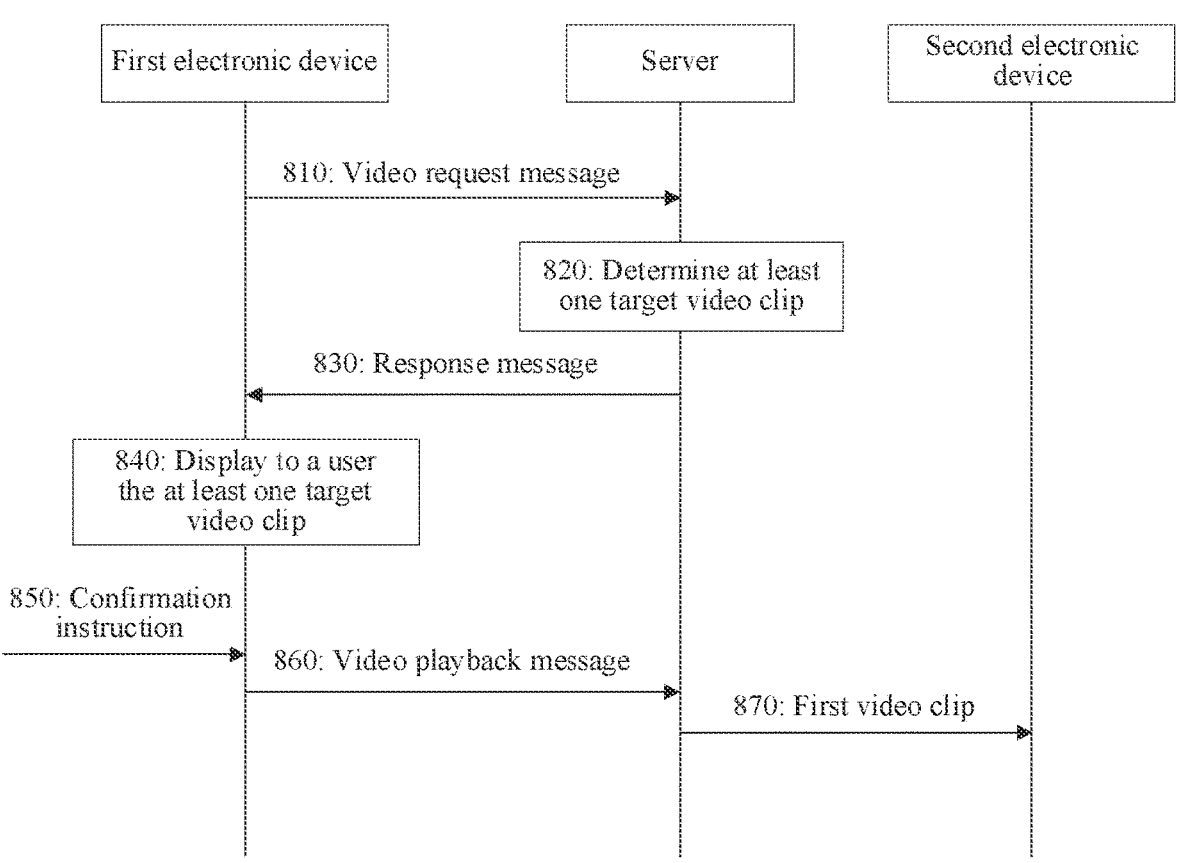
FIG. 8 is a flowchart of another example of a chat interaction method according to an embodiment of this application.

FIG. 8 is a flowchart of a chat interaction method 800 according to an embodiment of this application. As shown in FIG. 8, the method 800 includes the following steps.

Step 810: A first electronic device sends a video request message of a chat text to a server, where the video request message is used to request at least one target video clip, the target video clip includes a target dialog text that appears in a form of a subtitle, and the target dialog text and the chat text have same or similar semantics.

Step 820: The server determines the at least one target video clip according to the chat text.

Step 830: The first electronic device receives a response message sent by the server, where the response message is used by the first electronic device to display the at least one target video clip to a user.

Step 840: The first electronic device displays the at least one target video clip according to the response message sent by the server.

Step 850: The first electronic device receives a confirmation instruction from a user, where the confirmation instruction is used to indicate a first video clip, and the first video clip is one of the at least one target video clip.

Step 860: The first electronic device sends a video playback message to the server, where the video playback message is used to indicate the server to send the first video clip to a second electronic device.

Step 870: The server sends the first video clip to the second electronic device.

For a part that is not described in detail in the method 800, refer to the foregoing embodiments. Details are not described herein again.

It may be understood that, to implement the foregoing functions, devices such as the first electronic device, the second electronic device, and the server include corresponding hardware and/or software modules for performing the functions. In combination with example algorithm steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the first electronic device, the second electronic device, the server, and the like may be divided into functional modules based on the foregoing method examples. For example, each functional module may be obtained through division into each corresponding function, or two or more functions may be integrated into one processing module. The integrated module may be implemented in a form of hardware. It should be noted that, in this embodiment, division into the modules is an example, and is merely logical function division. There may be another division manner in actual implementation. This is not limited in this embodiment of this application.

It should be noted that all related content of the steps in the foregoing method embodiments may be cited in function description of corresponding functional modules. Details are not described herein again.

Devices such as the first electronic device, the second electronic device, and the server provided in this embodiment are configured to perform the foregoing chat interaction method. Therefore, an effect the same as that of the foregoing implementation method can be achieved.

When an integrated unit is used, devices such as the first electronic device, the second electronic device, and the server may include a processing module, a storage module, and a communications module. The processing module may be configured to control and manage an executed action, and the storage module may be configured to store program code, data, and the like. The communications module may be configured to support communication between the first electronic device, the second electronic device, and the server.

The processing module may be a processor or a controller. The processor may implement or execute various example logical blocks, modules, and circuits described with reference to content disclosed in this application. The processor may alternatively be a combination for implementing a computing function, for example, a combination including one or more microprocessors or a combination of a digital signal processor (digital signal processor, DSP) and a microprocessor. The storage module may be a memory. The communications module may be specifically a device, for example, a radio frequency circuit, a Bluetooth chip, or a Wi-Fi chip, that interacts with another electronic device.

In an embodiment, when the processing module is a processor, and the storage module is a memory, the first electronic device and the second electronic device in this embodiment may be devices having a structure shown in FIG. 4.

This embodiment further provides a computer-readable storage medium. The computer-readable storage medium stores computer instructions. When the computer instructions are run, the foregoing related method steps may be performed in a system including devices such as a first electronic device, a second electronic device, and a server, to implement the chat interaction method in the foregoing embodiment.

This embodiment further provides a computer program product. When the computer program product runs on a computer, the computer is enabled to perform the foregoing related steps, to implement the chat interaction method in the foregoing embodiment.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the chat interaction method in the foregoing method embodiments.

The first electronic device, the second electronic device, the server, the computer-readable storage medium, the computer program product, or the chip provided in this embodiment are all configured to perform the corresponding methods provided above. Therefore, for beneficial effects that can be achieved by the first electronic device, the second electronic device, the server, the computer-readable storage medium, the computer program product, or the chip, refer to the beneficial effects in the corresponding methods provided above. Details are not described herein again.

The foregoing descriptions of implementations allow a person skilled in the art to understand that, for the purpose of convenient and brief description, division into the foregoing functional modules is merely used as an example for illustration. During actual application, the foregoing functions can be allocated to different functional modules for implementation according to a requirement, that is, an inner structure of an apparatus is divided into different functional modules to implement all or a part of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory. RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A chat interaction method, comprising:

sending, by a first electronic device, a video request message of a chat text to a server, wherein the video request message is used to request at least one target video clip, the target video clip comprises a target dialog text that appears in a form of a subtitle, and the target dialog text and the chat text have same or similar semantics, and wherein the target video clip is determined by:

converting the chat text into a chat text vector;

calculating a relative distance between the chat text vector and dialog text vectors in a dialog text index library, wherein the dialog text vectors correspond to dialog texts that appear as subtitles in video clips; and determining a video clip corresponding to a dialog text vector whose relative distance from the chat text vector is less than a preset threshold as the target video clip;

displaying, by the first electronic device, the at least one target video clip according to a response message sent by the server, wherein the response message comprises a preview poster link corresponding to each target video clip, wherein the preview poster link comprises a download address of a preview poster, and displaying, by the first electronic device, the at least one target video clip according to the response message sent by the server comprises:

downloading and displaying, by the first electronic device, the preview poster of each target video clip according to the preview poster link;

receiving, by the first electronic device, a confirmation instruction from a user, wherein the confirmation instruction is used to indicate a first video clip, and the first video clip is one of the at least one target video clip; and sending, by the first electronic device, a video playback message to the server, wherein the video playback message is used to indicate to the server to send the first video clip to a second electronic device.

2. The chat interaction method according to claim 1, wherein:

the response message comprises the target dialog text of each of the at least one target video clip; and the displaying, by the first electronic device, the at least one target video clip according to a response message sent by the server comprises:

displaying, by the first electronic device, the target dialog text of each target video clip.

3. The chat interaction method according to claim 1, wherein:

the response message further comprises information about a download address of a complete video corresponding to the first video clip, and information about a time segment location of the first video clip in the complete video; and the displaying, by the first electronic device, the at least one target video clip according to a response message sent by the server comprises:

downloading and playing, by the first electronic device, the first video clip according to the download address of the complete video and the time segment location.

4. The chat interaction method according to claim 1, wherein before the sending, by a first electronic device, a video request message of a chat text to a server, the method further comprises:

determining, by the first electronic device, that no other input operation is performed within a preset duration after the user enters the chat text in a text input box.

5. The chat interaction method according to claim 1, wherein:

there are a plurality of target video clips;

the response message further comprises information about matching degrees; and the displaying, by the first electronic device, the at least one target video clip according to a response message sent by the server comprises:

displaying, by the first electronic device, each of the target video clips in a form of a list according to the matching degrees in descending order.

6. An electronic device, comprising:

one or more processors; and one or more memories, wherein the one or more memories store one or more computer programs, the one or more computer programs comprise instructions that, when executed by the one or more processors, cause the electronic device to perform operations including:

sending a video request message of a chat text to a server, wherein the video request message is used to request at least one target video clip, the target video clip comprises a target dialog text that appears in a form of a subtitle, and the target dialog text and the chat text have same or similar semantics, and wherein the target video clip is determined by:

converting the chat text into a chat text vector;

calculating a relative distance between the chat text vector and dialog text vectors in a dialog text index library, wherein the dialog text vectors correspond to dialog texts that appear as subtitles in video clips; and determining a video clip corresponding to a dialog text vector whose relative distance from the chat text vector is less than a preset threshold as the target video clip;

displaying the at least one target video clip according to a response message sent by the server, wherein the response message comprises a preview poster link corresponding to each target video clip, wherein the preview poster link comprises a download address of a preview poster, and displaying, by the electronic device, the at least one target video clip according to the response message sent by the server comprises:

downloading and displaying, by the electronic device, the preview poster of each target video clip according to the preview poster link;

receiving a confirmation instruction from a user, wherein the confirmation instruction is used to indicate a first video clip, and the first video clip is one of the at least one target video clip; and sending a video playback message to the server, wherein the video playback message is used to indicate the server to send the first video clip to a second electronic device.

7. The electronic device according to claim 6, wherein the response message comprises the target dialog text of each of the at least one target video clip, the one or more computer programs further including instructions that, when executed by the one or more processors, cause the electronic device to perform operations including:

displaying the target dialog text of each target video clip.

8. The electronic device according to claim 6, wherein the response message further comprises information about a download address of a complete video corresponding to the first video clip, and information about a time segment location of the first video clip in the complete video, the one or more computer programs further including instructions that, when executed by the one or more processors, cause the electronic device to perform operations including:

downloading and playing the first video clip according to the download address of the complete video and the time segment location.

9. The electronic device according to claim 6, the one or more computer programs further including instructions that, when executed by the one or more processors, cause the electronic device to perform operations including:

before sending the video request message of the chat text to the server, determining that no other input operation is performed within a preset duration after the user enters the chat text in a text input box.

10. The electronic device according to claim 6, wherein there are a plurality of target video clips, the response message further comprises information about matching degrees, the one or more computer programs further including instructions that, when executed by the one or more processors, cause the electronic device to perform operations including:

displaying each of the target video clips in a form of a list according to the matching degrees in descending order.

11. A server, comprising:

one or more processors; and one or more memories, wherein the one or more memories store one or more computer programs, the one or more computer programs comprise instructions that, when executed by the one or more processors, cause the server to perform operations including:

receiving a video request message of a chat text sent by a first electronic device, wherein the video request message is used to request at least one target video clip, the target video clip comprises a target dialog text that appears in a form of a subtitle, and the target dialog text and the chat text have same or similar semantics;

determining the at least one target video clip according to the chat text, and wherein the target video clip is determined by:

converting the chat text into a chat text vector;

calculating a relative distance between the chat text vector and dialog text vectors in a dialog text index library, wherein the dialog text vectors correspond to dialog texts that appear as subtitles in video clips; and determining a video clip corresponding to a dialog text vector whose relative distance from the chat text vector is less than a preset threshold as the target video clip;

sending a response message to the first electronic device, wherein the response message is used by the first electronic device to display the at least one target video clip; the response message further comprises a preview poster link corresponding to each target video clip, wherein the preview poster link comprises a download address of a preview poster, and the preview poster link is used by the first electronic device to download and display the preview poster of each target video clip;

receiving a video playback message sent by the first electronic device, wherein the video playback message is used to indicate the server to send a first video clip to a second electronic device, and the first video clip is one of the at least one target video clip; and sending the first video clip to the second electronic device.

12. The server according to claim 11, wherein the response message comprises the target dialog text of each of the at least one target video clip.

13. The server according to claim 11, wherein:

the response message further comprises information about a download address of a complete video corresponding to the first video clip, and information about a time segment location of the first video clip in the complete video; and the download address of the complete video and the time segment location enable the first electronic device to download and play the first video clip.

14. The server according to claim 11, wherein:

there are a plurality of target video clips, the response message further comprises information about matching degrees, and the matching degrees enable the first electronic device to display each of the target video clips in a form of a list of the matching degrees in descending order.

15. The server according to claim 11, wherein the one or more computer programs further including instructions that, when executed by the one or more processors, cause the server to perform operations including:

matching the chat text with a dialog text in a dialog text index library, wherein the dialog text index library comprises a correspondence between the dialog text and a video clip; and determining a video clip corresponding to a successfully matched dialog text as the target video clip.

16. The server according to claim 15, wherein:

the correspondence between the dialog text and a video clip comprises a correspondence between the dialog text and a complete video, and a correspondence between the dialog text and a time segment location of the dialog text in the complete video, and the one or more computer programs further including instructions that, when executed by the one or more processors, cause the server to perform operations including:

determining, as the target video clip, video content that is of the complete video corresponding to the successfully matched dialog text and that is located at the time segment location.

17. The server according to claim 15, wherein:

the dialog text in the dialog text index library exists in a form of a dialog text vector.

* * * * *